United States Patent Office 3,200,537
Patented Aug. 17, 1965

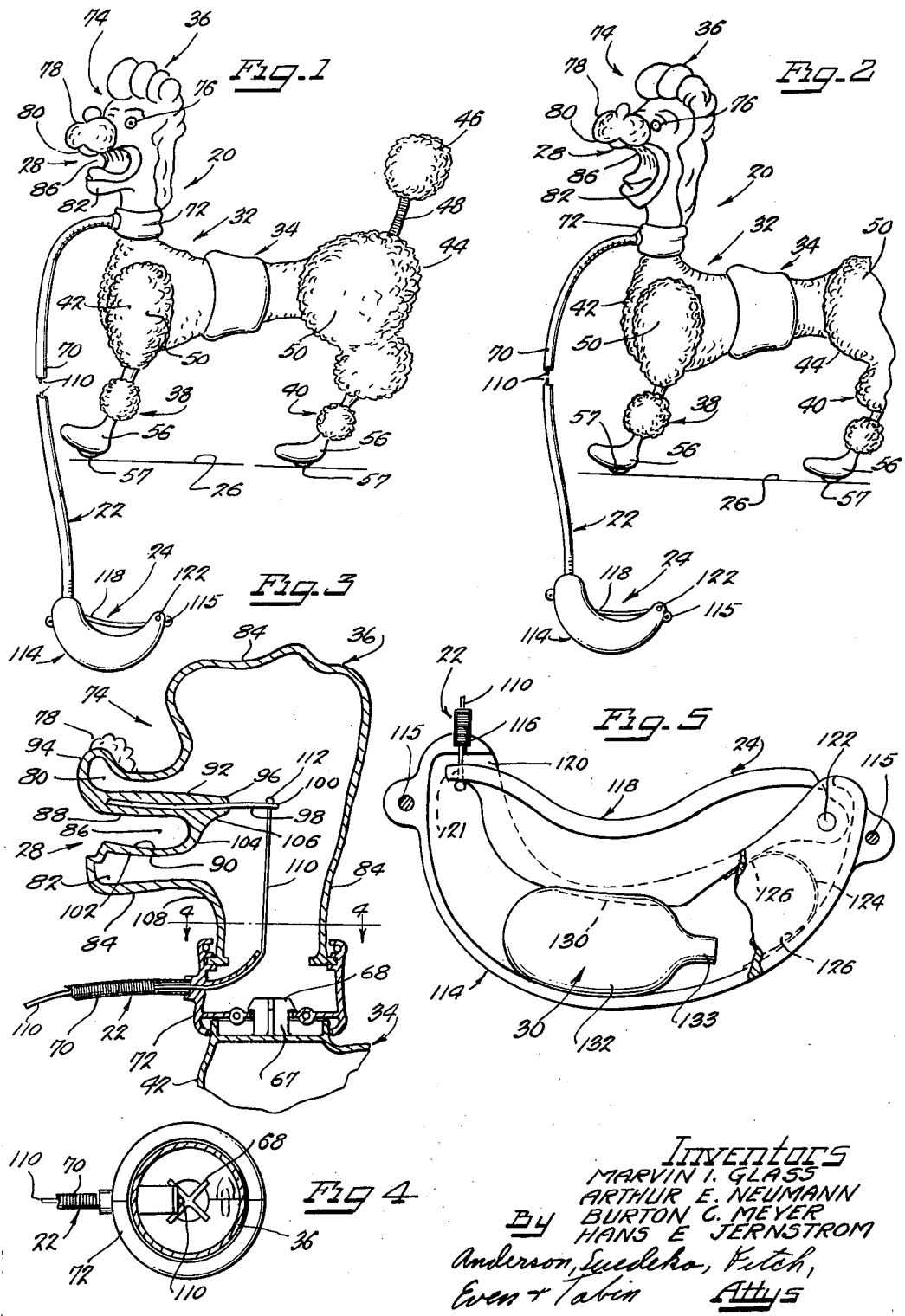

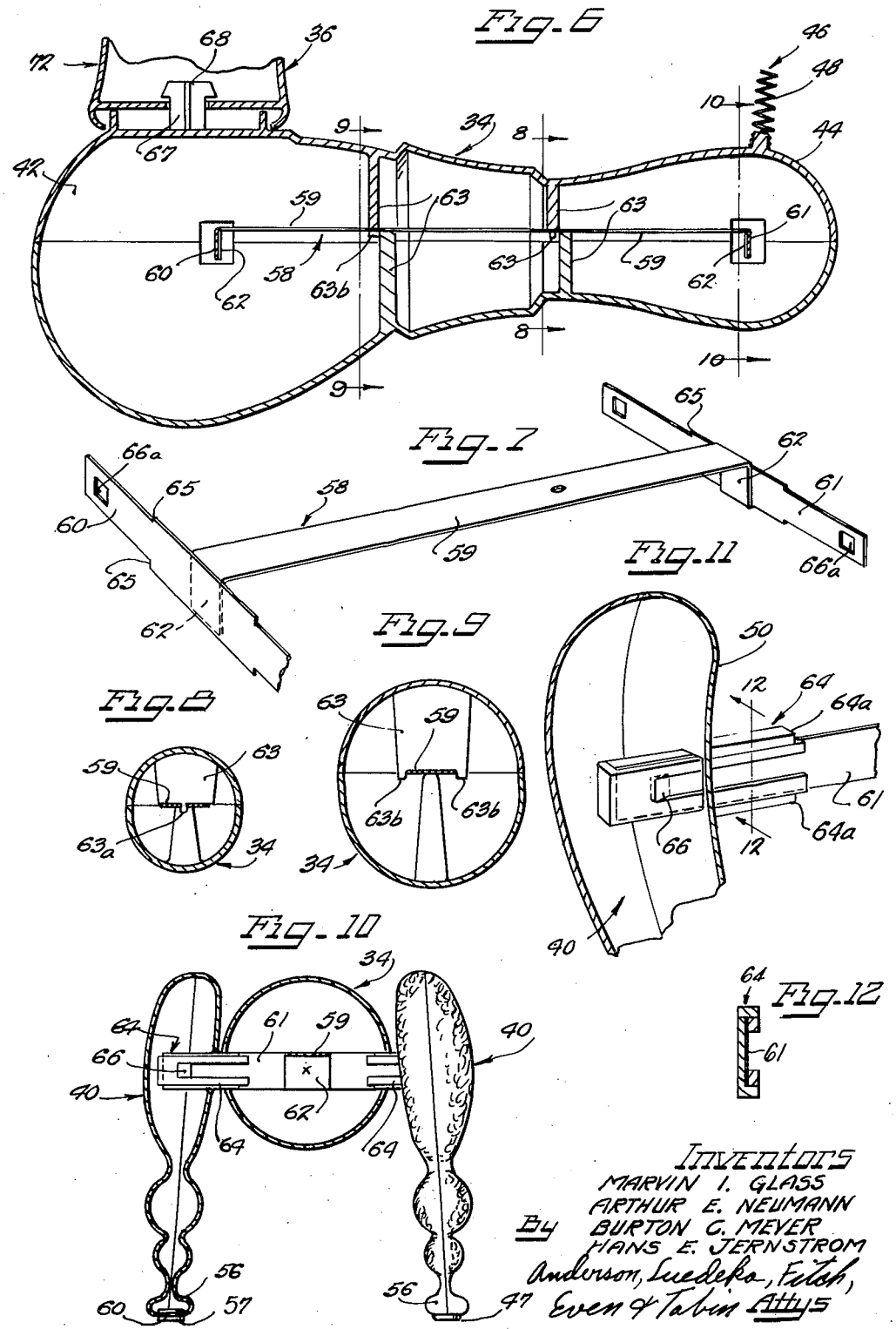

3,200,537
TOY WALKING DOG
Marvin I. Glass, Chicago, Arthur E. Neumann, Winnetka, and Burton C. Meyer and Hans E. Jernstrom, Chicago, Ill., assignors to Marvin Glass & Associates, Chicago, Ill., a partnership
Filed Feb. 25, 1963, Ser. No. 260,797
5 Claims. (Cl. 46—118)

This invention relates generally to a toy and, more particularly, to a toy animal and to features thereof.

Various sorts of toy animals are traditionally popular as play things for children, and many such toy animals attempt to simulate the actions of their prototypes. While various forms of articulation are provided in toy animals, coordination of various animal actions is difficult to obtain in a commercially practical toy because of cost limitations and the necessity of providing a toy which is sufficiently durable to withstand handling by children. Some degree of realism in various actions of the toy animal is important, but of greater importance is provision for a child to participate in the action of the animal and to be amused at the result.

It is, therefore, the primary object of this invention to provide a new and amusing toy.

A further object is provision of a new and amusing toy animal which may be pulled by a child and give the appearance of the animal walking. A related object is provision of new and useful leg mounting means for such a toy.

A still further object is provision of a new and amusing toy animal having a movable mouth. A related object is provision of novel means selectively operable by a child for moving the mouth. Another related object is provision in such a toy of a noisemaker operable concurrently with operation of the movable mouth for emitting an appropriate animal sound.

A more specific object is provision of a new and amusing toy in the form of an animal on a leash for leading the animal across a supporting surface with the animal's legs moving in a walking manner, and selectively moving the animal's mouth while concurrently emitting an appropriate animal sound.

These and other objects of the invention are more particularly set forth in the following detailed description and the accompanying drawings of which:

FIGURE 1 is a side view of an embodiment of the invention in the form of an articulated toy dog on a leash, the dog having a movable mouth illustrated in a closed position, with parts broken away for clearer illustration;

FIGURE 2 is a fragmentary view similar to FIGURE 1, but with the mouth in an open position, and with parts broken away;

FIGURE 3 is an enlarged, fragmentary side elevational view of a head and upper torso portion of the animal, with parts broken away for clearer illustration;

FIGURE 4 is a fragmentary, horizontal sectional view taken generally along the line 4—4 in FIGURE 3, with parts broken away for clearer illustration;

FIGURE 5 is an enlarged, fragmentary, longitudinal view showing a grip-actuator on a free end of the leash, with parts broken away for clearer illustration;

FIGURE 6 is an enlarged, fragmentary, longitudinal vertical sectional view of the head and torso;

FIGURE 7 is a perspective view of a leg mounting member shown in FIGURE 6, but removed from the torso;

FIGURES 8, 9 and 10 are vertical sectional views taken on the lines 8—8, 9—9 and 10—10, respectively, in FIGURE 6;

FIGURE 11 is an enlarged, fragmentary perspective view of a connection between a leg and the leg mounting member; and FIGURE 12 is a vertical sectional view taken generally along the line 12—12 in FIGURE 11.

The illustrated embodiment of the invention is, in brief, directed to a toy, and more particularly, to a toy dog which may be led by a leash for walking the dog in a realistic manner and for causing the dog to bark while moving its mouth. Upon suitable handling of the leash, the toy dog may be made to walk in a straight or curved path, turn its head from side to side, move its mouth and bark.

With general reference to FIGURES 1–6, the selected embodiment includes a toy dog 20 on a leash 22. A grip-actuator 24 on a free end of the leash is provided for leading the dog across a supporting surface 26, such as a floor, either straight ahead or in a curved path while turning the dog's head, and for selectively operating a movable mouth 28 and a noisemaker 30 (FIGURE 5) to emit an appropriate barking sound. The dog 20 has a body 32 including a torso 34 with a head movably mounted on the torso, and a pair of front legs 38 and a pair of rear legs 40 depending from the torso. In the illustrated embodiment the dog is generally in the form of a French Poodle.

More particularly, the torso 34 is hollow and includes a front end 42 and a rear end 44, preferably of a relatively rigid molded plastic material. A tail 46 extends upwardly from the rear end 44 and is preferably in the form of a spiral spring 48 so that it may move as the dog walks.

The front and rear legs may be similar to each other, and herein each is preferably hollow and of a relatively rigid molded plastic material and includes an upper mounting portion 50 attached to the adjacent end, 42 or 44, of the torso 34. Each leg has a foot 56 with a high friction bottom pad 57 for engaging the supporting surface 26. Herein the high friction surface of each foot 56 is in the form of a resilient cylindrical pad, preferably a suitable rubber or other material, secured on the bottom of the body of each foot as by an annular groove 60 (FIGURE 10) in the pad engaging an inwardly turned edge portion of the foot.

Leg mounting means is provided for mounting the legs 38 and 40 on the body 32 for walking articulation of the legs on the supporting surface 26 as the toy dog is led across the surface. As may best be seen in FIGURES 6–12, this means is illustrated in the form of a resilient mounting member 58 having a flat first leaf spring 59 disposed in a generally horizontal plane and extending lengthwise through the hollow torso 34, with front and rear ends of the spring disposed within the front and rear ends of the torso, respectively. A front end spring 60 and a rear end spring 61 are both in the form of flat leaf springs herein disposed in parallel vertical planes. The end springs each have an intermediate portion rigidly secured to the adjacent end of the first spring 59 and, as illustrated, depending tabs 62 on either end of the first spring are secured to the end springs as by spot welding.

The first spring 59 has an intermediate portion (FIGURE 6) firmly mounted on the torso 34 and herein the intermediate portion extends between longitudinally spaced pairs of upper and lower abutments 63 of the torso 34, as illustrated also in FIGURES 8 and 9. One of the upper abutments has a depending prong 63a (FIGURES 6 and 8) extending through a hole in the first spring 59 to hold the mounting member 58 against movement lengthwise or transversely of the torso 34. The other upper abutment has spaced apart depending prongs 63b embracing opposite edges of the first spring to hold the spring against movement transversely of the torso 34.

The other upper abutment has spaced apart depending prongs 63b embracing opposite edges of the first spring to hold the spring against movement transversely of the torso.

The upper mounting portion 50 of each of the legs has a mounting bracket 64 (FIGURES 10–12) firmly secured thereto and extending into the torso where it telescopically receives an adjacent free end mounting portion of an adjacent end spring. In the illustrated embodiment, each bracket has opposed, vertically spaced channel members 64a opening toward each other and the channels receive opposite edges of the adjacent free end of the end spring. The inner end of each bracket abuts shoulders 65 (FIGURE 7) in the upper and lower edges of the adjacent end spring, with a tab 66 on the bracket received in an aperture 66a in the end spring. Thus, as the dog is led across the supporting surface 26, the pads 57 will resist movement across the supporting surface and thus cause the mounting member 58 to flex. More particularly, the longitudinal mounting spring member 59 may flex up and down and also twist at its ends, and the free ends of the end springs 60 and 61 may move horizontally with the twisting of the ends of spring 59 and the ends of springs 60 and 61 may also twist about their longitudinal axes so as to provide a motion for the legs which affords a realistic walking action. As such flexing of the spring members increases, the foot pads 57 release their grip on the supporting surface 26 and permit the legs to flip forward, thus providing a sharp, saucy walking action for the dog which is particularly characteristic of the French Poodle.

The head 36 is surmounted on the torso front end 42. As may best be seen in FIGURES 3 and 4, the head is hollow and is preferably of a relatively resilient, molded plastic material having a lower end receiving a spindle 67 extending upwardly from the front end 42 of the torso 34. A spindle head 68 retains the parts operatively assembled. Thus, the dog's head 36 may be rotated from side to side about a generally upright pivotal axis.

Means for pivoting the head and moving the dog 20 across the surface 26 is provided by a line, here in the form of the leash 22 and more particularly a cable sheath 70 having an end firmly anchored on a neck portion 72 of the head 36. It should be noted that the leash 22 is anchored on the dog at an elevation well above the upper ends of the leg mounting portions 50 in order to provide a more realistic walking action. By anchoring the leash on a lower portion of the pivotal head, the head turns in a natural manner as the leash is directed from side to side.

With particular reference to FIGURES 1–3, a face portion 74 of the head 36 may include eyes 76 of any suitable and desired type and, extending forwardly from and slightly below the eyes is a muzzle 78 including an upper jaw 80 and a lower jaw 82 cooperating to define the movable mouth 28. Inherent resiliency of the mouth structure urges the mouth to a normal, substantially closed position. With particular reference to FIGURE 3, the head 36 is of a suitable resilient plastic material and of hollow construction defined by a continuous wall which is generally relatively thin, as indicated by the portions 84. A mouth cavity 86 extends inwardly between the upper and lower jaws and defines generally horizontal upper and lower mouth surfaces 88 and 90, respectively. The upper surface 88 is provided by a relatively heavy cavity wall 92 gradually diminishing in thickness as it arches forwardly and upwardly into a return portion defining a nose 94 and merging into the relatively thin wall 84 which extends horizontally and rearwardly therefrom toward the eyes 76. The mouth upper wall 92 extends rearwardly from the front of the mouth cavity 86 to a rear inner end 96. A relatively rigid plate-like member 98 is embedded in the upper wall 92 and extends rearwardly from the front end of the wall in a direction generally parallel to the mouth cavity upper surface 88 and past the upper wall rear end 96, terminating in a free anchoring end 100. The mouth cavity lower surface 90 is provided by a generally horizontal lower cavity wall 102 which is preferably slightly thinner than the thickness of the wall portions 84. The lower wall 102 extends rearwardly from the front of the mouth cavity 86 and terminates in a rear inner end 104.

Means for causing the lower wall 102 to move from closed to open position as the upper wall 92 moves to open position is provided by connecting wall 106. The connecting wall is inclined upwardly and inwardly or rearwardly from the lower wall inner end 104 and toward the upper wall inner end 96 and the free anchoring end 100 of the rigid member 98. Thus, the connecting wall 106 interconnects the upper wall 92 and the lower wall 102 and increases in thickness from the lower wall upwardly to the upper wall, as may be clearly seen in FIGURE 3. With the mouth in the normal position, as shown in FIGURES 1 and 3, upon moving the free inner end 100 of the rigid member 98 downwardly with respect to the remainder of the head 36, the upper wall 92 is inclined upwardly, thus flexing the interconnecting wall 106 to incline the lower wall 102 downwardly with the lower jaw 82 pivoting along an arched portion 108 interconnecting the lower jaw and the neck portion 72 of the head.

Operating means for operating the movable mouth 28 between its open and closed positions is provided in the illustrated embodiment by a strand in the form of a cable 110 slidably telescoped through the sheath 70, with a free end of the cable 110 anchored on the free anchoring end 100 of the rigid plate 98 in any suitable manner as by the cable extending upwardly through an aperture in the plate and having a headed portion 112 seated on the upper surface of the plate. Upon pulling the cable 110 outwardly through the sheath, the plate end 100 is moved downwardly causing the upper surface 88 of the mouth to pivot upwardly and the lower surface 90 of the mouth to pivot downwardly as previously described.

The operating means further includes the grip-actuator 24, as may best be seen in FIGURE 5. The grip-actuator has a grip body part 114 of any desired material such as a suitable rigid molded plastic, preferably molded in halves secured together in any suitable manner as by rivets 155. One of the grip has a socket 116 receiving the free end of the sheath and firmly secured thereto so that the grip may be hand held in leading the toy dog 20 across the surface 26 and for moving the lead from side to side to pivot the head 36 and walk the dog in a curved path. An actuator part 118 extends into a slot 120 in the grip 114 and has one end with an aperature 121 receiving an outer free end of the cable 110 to anchor the cable on the actuator. An opposite end of the actuator is pivotally mounted on an opposite end of the grip by means of a pivot pin 122 seated in the grip and extending through a hollow in the actuator. Resilient means, here in the form of U-shaped spring 124 has opposite legs 126 seated against adjacent inner portions of the grip and the actuator, for urging the actuator outwardly from the grip. An intermediate portion of the actuator has an abutment edge 130 received within the grip body and engaging the noisemaker means for producing an appropriate animal sound, in this environment a barking sound.

Herein the noisemaker means is in the form of the noisemaker 30 having resilient means in the form of a suitable resilient air bulb 132 engaging the actuator abutment 130 and urging the actuator outwardly in the same direction as does the spring 124. The noisemaker preferably has a suitable whistle device 133 to that upon squeezing the actuator 118 inwardly of the grip 114, the abutment edge 130 compresses the bulb 132 causing the noisemaker to emit a barking sound. Along with such inward movement of the actuator 118, the cable 110 is pulled into the grip body thus causing the mouth 28 to move from its normally closed position, as shown in FIGURE 1, to its open position as shown in FIGURE 2.

Upon releasing the actuator 118, the spring 124 and the resilient bulb 132 urge the actuator outwardly so that the cable 110 slides through the sheath 70 and into the head 36. If desired, the noisemaker may be provided with a two-way whistle so that either compression or expansion of the bulb 132 causes emission of a barking sound.

To summarize the operation of the toy animal, a child places the animal upon the pads 57 of the front and rear legs and grasps the grip-actuator 24 to pull the toy forwardly across the supporting surface 26. Such pulling causes the torso 34 and head 36 to move forwardly with the legs 38 and 40 remaining in place because of the pads 57 gripping the supporting surface 26. Continued forward pulling of the animal results in the torso 34 moving forwardly and flexing the resilient mounting member 58 sufficiently that the pads 57 individually release their hold on the supporting surface 26 and the legs flip forwardly in a manner closely simulating a dog walking. When it is desired to have the dog walk in a curved path, it is merely necessary to pull the leash 22 to one side, whereupon the head 36 will turn about the spindle 67 and the animal will walk in the new direction. Upon the child squeezing the actuator 118, the actuator abutment edge 130 compresses the noisemaker bulb 132 causing the whistle 133 to emit a barking sound and concurrently the cable 110 is drawn into the grip causing the cable to move the end of the plate 98 downwardly and open the dog's mouth as illustrated in FIGURE 2. Upon releasing the actuator 118, the resilient bulb 132 and the spring 124 move the actuator 118 outwardly of the grip, releasing the cable 110 and permitting the inherent resiliency of the mouth structure to close the mouth.

Thus, the toy dog provides a realistic walking movement as it is pulled by the leash 22 across the supporting surface 26, and the preferred structure is both economical to manufacture and durable in use.

While this invention has been described with reference to certain structure and materials in a particular environment, various changes may be appaaent to one skilled in the art and the invention is therefore not to be limited to such structure, material or environment. Various of the features of the invention are set forth in the following claims.

What is claimed is:

1. A toy animal comprising, a body including a torso having front and rear ends, a head mounted on said front end, a pair of relatively rigid front legs and a pair of rigid rear legs associated with the front and rear torso ends, respectively, means including a relatively resilient mounting member operatively attaching said legs to said torso for walking articulation of said legs on said supporting surface as said body is moved across said surface, said mounting member including a first flat spring extending lengthwise within said torso and having front and rear ends adjacent said front and rear torso ends, respectively, a pair of front and rear flat springs extending across said torso, said front and rear springs each having an intermediate portion rigidly secured, respectively, to said front and rear ends of said first spring, said front and rear springs each having leg mounting portions on opposite ends thereof with said mounting portions securing said legs to said torso, and means firmly securing an intermediate portion of said first spring to said torso in a manner affording axial twisting and vertical flexing movement of said front and rear ends of said first flat spring.

2. A toy animal comprising, a body including a torso having front and rear ends, a head mounted on said front end, a pair of relatively rigid front legs and a pair of rigid rear legs associated with the front and rear torso ends, respectively, means including a relatively resilient mounting member operatively attaching said legs to said torso for walking articulation of said legs on said supporting surface as said body is moved across said surface, said mounting member including a first flat spring extending lengthwise within said torso and having front and rear ends adjacent said front and rear torso ends, respectively, a pair of front and rear flat springs extending across said torso, said front and rear springs each having an intermediate portion rigidly secured, respectively, to said front and rear ends of said first spring, said front and rear springs each having leg mounting portions on opposite ends thereof securing said legs to said torso, means firmly securing an intermediate portion of said first spring to said torso in a manner affording axial twisting and vertical flexing movement of said front and rear ends of said first flat spring, and operating means including a line having an end connected to said body to provide means for pulling the body across said supporting surface with said mounting member being operative to cause said legs to move in a walking manner.

3. A toy animal comprising, a body including, a generally hollow torso having front and rear ends, a head mounted on said front end, and a pair of relatively rigid front legs and a pair of relatively rigid rear legs associated with the front and rear torso ends, respectively, one leg of each pair at each side of said torso, each of the legs having a high friction pad for engaging a supporting surface, leg mounting means including a relatively resilient mounting member operatively attaching said legs to said torso for walking articulation of said legs on said supporting surface as said body is moved across said surface, said mounting member including, a first flat leaf spring disposed in a generally horizontal plane and extending lengthwise within said torso and having front and rear ends adjacent said front and rear torso ends, respectively, front and rear flat leaf springs disposed in generally vertical planes and extending across said torso, said front and rear springs being fixed to opposite ends of said first spring and each having leg mounting portions on opposite sides of said first spring, one of said mounting portions being adjacent each of said legs, and each of said mounting portions being secured to an upper end of the adjacent one of said legs, means firmly securing an intermediate portion of said first spring to said torso in a manner affording twisting and vertical flexing movement of said front and rear ends of said first spring, and means including a line having an end connected to said body for moving said body across said supporting surface with said legs moving in a walking manner and said pads engaging said supporting surface.

4. A toy animal comprising, a body including, a hollow torso having front and rear ends, a head movably mounted on said front end, a pair of relatively rigid front legs and a pair of relatively rigid rear legs associated with the front and rear torso ends, respectively, one leg of each pair at each side of said torso, each of the legs having a high friction pad for engaging a supporting surface, leg mounting means including a relatively resilient mounting member operatively attaching said legs to said torso for walking articulation of said legs on said supporting surface as said body is moved across said surface, said mounting member including, a first flat leaf spring disposed in a generally horizontal plane and extending lengthwise within said torso and having front and rear ends adjacent said front and rear torso ends, respectively, front and rear flat leaf springs disposed in generally vertical planes and extending across said torso, said front and rear springs being fixed to opposite ends of said first flat spring and each having leg mounting portions on opposite sides of said first spring, one of said mounting portions being adjacent each of said legs, and each of said mounting portions being rigidly secured to an upper end of the adjacent one of said legs, means firmly securing an intermediate portion of said first spring to said torso in a manner affording twisting and vertical flexing movement of said front and rear ends of said first spring, noisemaker means operable for simulating an appropriate animal sound, and operating means including a line having an end connected to said body at said head for moving said head relative to said torso and pulling said body across said supporting surface with said legs moving in a walking manner and said pads engaging said supporting surface, and a grip-actuator connected to an opposite end of said line for tensioning the line when pulling said body and for selectively operating said noisemaker means.

5. A toy animal comprising, a body including, a hollow torso having front and rear ends, a head movably mounted on said front end, said head having a selectively movable mouth, a pair of relatively rigid front legs and a pair of relatively rigid rear legs associated with the front and rear torso ends, respectively, one leg of each pair at each side of said torso, each of the legs having a high friction pad for engaging a supporting surface, leg mounting means including a relatively resilient mounting member operatively attaching said legs to said torso for walking articulation of said legs on said supporting surface as said body is moved across said surface, said mounting member including, a first flat leaf spring disposed in a generally horizontal plane and extending lengthwise within said torso and having front and rear ends adjacent said front and rear torso ends, respectively, front and rear flat leaf springs disposed in generally vertical planes and extending across said torso, said front and rear springs being fixed to opposite ends of said first flat spring and each having leg mounting portions on opposite sides of said first spring, one of said mounting portions being adjacent each of said legs, and each of said mounting portions being rigidly secured to an upper end of the adjacent one of said legs, means firmly securing an intermediate portion of said first spring to said torso in a manner affording twisting and vertical flexing movement of said front and rear ends of said first spring, operating means including a line having an end connected to said body at said head for moving said head relative to said torso and pulling said body across said supporting surface with said legs moving in a walking manner and said pads engaging said supporting surface, and a grip-actuator including a noisemaker and connected to an opposite end of said line for tensioning the line when pulling said body for moving said head and selectively moving said mouth, and for concurrently operating said noisemaker means with the movement of said mouth.

References Cited by the Examiner

UNITED STATES PATENTS

| | | | |
|---|---|---|---|
| 1,438,108 | 12/22 | Gund | 46—118 |
| 2,452,658 | 11/48 | Horne | 46—178 |
| 2,586,938 | 2/52 | Gowland | 46—118 X |
| 2,663,970 | 12/53 | Brodrib | 46—123 |
| 2,717,473 | 9/55 | Moore | 46—178 |
| 2,824,409 | 2/58 | Brodrib | 46—163 X |
| 2,846,810 | 8/58 | Ory | 46—123 |
| 2,954,639 | 10/60 | Walss | 46—120 |
| 3,060,631 | 10/62 | Collischan | 46—118 |

FOREIGN PATENTS

| | | |
|---|---|---|
| 567,526 | 12/23 | France. |
| 522,249 | 4/31 | Germany. |

RICHARD C. PINKHAM, *Primary Examiner.*